(12) United States Patent
Roser Laromaine

(10) Patent No.: US 6,596,330 B1
(45) Date of Patent: Jul. 22, 2003

(54) METHOD FOR PREPARING A MEAT PRODUCT

(76) Inventor: Jaime Roser Laromaine, Ctra. Girona 369, Cassa de la Selva (ES), 17244

( * ) Notice: Subject to any disclaimer, the term of this patent is extended or adjusted under 35 U.S.C. 154(b) by 73 days.

(21) Appl. No.: 09/592,255

(22) Filed: Jun. 12, 2000

Related U.S. Application Data

(63) Continuation-in-part of application No. PCT/ES98/00335, filed on Dec. 9, 1998.

(30) Foreign Application Priority Data

Dec. 12, 1997 (ES) .............................................. 9702586

(51) Int. Cl.⁷ ................................................. A23L 1/00
(52) U.S. Cl. ....................................... 426/513; 426/641
(58) Field of Search ................................ 426/513, 641, 426/465; 99/349; 100/910

(56) References Cited

U.S. PATENT DOCUMENTS

| | | | |
|---|---|---|---|
| 1,676,816 A | | 7/1928 | Briggs |
| 5,472,722 A | | 12/1995 | Burger ........................ 426/264 |
| 5,670,195 A | * | 9/1997 | Palmer ........................ 426/513 |
| 5,980,966 A | * | 11/1999 | Handel ........................ 426/513 |

FOREIGN PATENT DOCUMENTS

| | | |
|---|---|---|
| DE | 3211817 A1 | 10/1983 |
| EP | 0218769 A2 | 4/1987 |
| EP | 0455611 A1 | 11/1991 |
| EP | 0519540 A1 | 12/1992 |
| ES | 496140 | 10/1980 |
| FR | 1237358 | 8/1959 |
| FR | 2485884 | 1/1982 |
| GB | 1593281 | 7/1981 |
| WO | WO96/10337 | 4/1996 |

* cited by examiner

*Primary Examiner*—George C. Yeung
(74) *Attorney, Agent, or Firm*—Jacobson Holman PLLC

(57) ABSTRACT

The process of the following steps: salting the meat; placing the meat in a mould; maturation and drying of the meat during a predetermined period of time; unmoulding the meat; and additional drying of the meat during a predetermined period of time on shelves. The maturation and drying step is carried out while applying pressure to the meat during a period of time of one month approximately in a pressing tour. This process gives a regular shape to the meat block which can be formed from a plurality of meat pieces linked to each other. Furthermore, the meat preparation process can be accelerated.

7 Claims, 3 Drawing Sheets

METHOD FOR PREPARING A MEAT PRODUCT

This is a continuation-in-part of application No. PCT/ES98/00335 filed Dec. 9, 1998.

According to a first aspect, this invention relates to a method for preparing a meat product, principally for the preparation of cured ham in a regular shape.

The invention also relates to a pressing tower and to an equipment for carrying out said method.

BACKGROUND OF THE INVENTION

The methods currently used for preparing a meat product, preferably ham, comprise the following steps:
a) Salting the meat;
b) Maturing and drying the meat for a predetermine period of time, until the weight of the meat decreases
c) Additional drying of the pieces of meat for a predetermined period of time.

Traditionally, if wished, the cured ham was then boned which had the drawback that the entire ham was not suitably profit. Moreover, the finished ham had a characteristic orifice at the place were the bone had been withdrawn, and was of irregular shape.

To solve these drawbacks methods were created in which the pieces of meat were boned before salting, thereby achieving a cured ham whose appearance was not harmed by said orifice, while better profit was made of the meat.

One example of this type of method is described in Spanish Patent n.496.140, which comprises the following steps:
a) Boning the raw ham;
b) Salting the pieces of ham;
c) Packing the pieces of meat in netting and placing them in containers;
d) Placing the containers in refrigeration chambers for a period of time ranging between 15 and 30 days, where the maturing and drying of the ham takes place; and
e) Placing the pieces of ham in a chamber at a temperature between 20° C. and 40° C. and with relative humidity of 55% to 78% for a period of time between 40 and 60 days.

This method has the drawback of not achieving a regular shape of the product and not producing linked pieces of meat, so that the pieces of ham will be of limited weight.

Moreover, the period of time needed to cure the ham is considerable, and can be as much as ninety days.

DESCRIPTION OF THE INVENTION

The method of the invention manages to solve the aforesaid drawback, while having other advantages that will be described below.

The method of the invention for preparation of a meat product from boned pieces of meat is characterised in that the step of maturing and drying the meat is implemented by applying pressure to the pieces of meat for an approximate period of time of one month.

Thanks to this characteristic, a regular shape of the piece of meat is achieved, with all the pieces being of the same size and shape.

This method also permits several linked pieces of meat to be obtained, or two pieces of identical shape. A piece of meat of any desired weight can thus be obtained, depending solely on the capacity of the mould.

Another advantage consists in acceleration of the process, so that the cured meat can be obtained with loss of between 30% and 35% in a period of time of 60 days. This acceleration of the process is achieved by the meat evacuating more rapidly its water content, due to being subjected to pressure for approximately one month.

Advantageously, after the meat has been placed in the mould it is first pressed to make the ham fit into the mould.

Preferably, the additional drying is carried out for an approximate period of time of one month.

According to a preferred embodiment of the method of he invention, the salting of the meat is carried out-in a vacuum-massage drum.

Preferably, after the meat is placed in the mould the meat is weighed.

Advantageously, the meat is wrapped in a piece of fabric when it is placed in the mould. This fabric, preferably of cotton, helps to maintain the humidity so that the meat does not dry out too much. It also makes it easier to remove the meat from the mould.

According to a second aspect, the invention relates to a pressing tower for preparing a meat product, characterised in that it includes a base on which are placed a plurality of stacked moulds, into which the meat is inserted, and it includes means for applying pressure to the mould or moulds placed at the top of the stack or stacks of moulds.

Advantageously, the means for applying pressure to the mould or moulds placed at the top of the stack or stacks of moulds include a surface fitted at the top part of the tower, whose downward movement is driven by for instance an fluid-operated cylinder.

Preferably, the shape of the lower part of the upper surface is substantially the same as the shape of the moulds into which the meat is inserted.

According to a third aspect, the invention relates to an equipment for carrying out the method for preparation of a meat product as describe above, and is characterised in that it includes:
a vacuum massage drum in which the meat is 5 salted;
a plurality of transportation tanks into which the meat is placed;
a tipping lifter that places the meat on a hopper table;
a plurality of moulds into which the meat is placed;
a weighing scale, which weighs the meat, placed inside each mould;
a press in which the meat is fitted into the 15 mould;
a pressing column in which the meat is matured and dried, applying pressure to the pieces of meat for a predetermine period of time, until the meat loses weight; and
a plurality of shelves on which an additional drying of the pieces of meat is carried out for a predetermine period of time.

Advantageously, the mould into which the meat is inserted includes a plurality of orifices for the passage of air, thereby permitting the drying to be carried out faster.

BRIEF DESCRIPTION OF THE DRAWINGS

For a better understanding of all that has been set out some drawings are attached which, schematically and only by way of non-restrictive example, show a practical case of embodiment.

DESCRIPTION OF A PREFERRED EMBODIMENT

Figure 1:
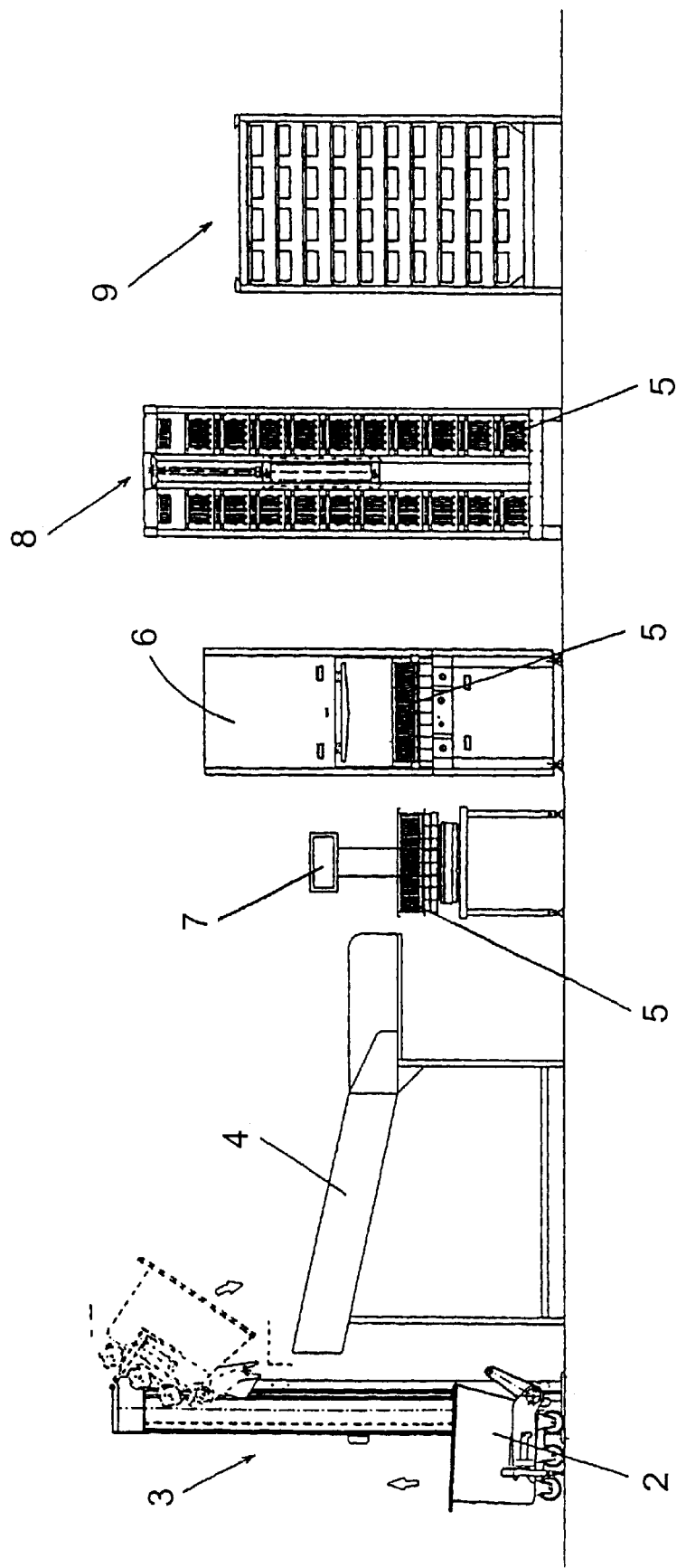
FIG. 1 is an elevation view of the equipment 35 used for carrying out the method of this invention.

As FIG. 1 shows, the equipment for carrying out the method for preparing a meat product comprises:

- a vacuum-massage drum (not shown) in which the meat is salted;
- a plurality of transportation tanks 2 into which the meat is placed;
- a tipping lifter 3 that places the meat on a hopper-table 4;
- a plurality of moulds into which the meat is inserted;
- a weighing scale 7 that weighs the meat placed inside each mould 5;
- a press 6 that, fits the meat into the mould 5; a pressing column 8 in which the meat is matured and dried, applying pressure to the pieces of meat for a predetermine period of time, normally of approximately one month, until the weight of the meat decreases by approximately 20%; and
- a plurality of shelves 9 on which an additional drying of the pieces of meat is carried out for a predetermine period of time, usually of approximately one month.

As can be observed, the moulds 5 are provided with a plurality of orifices 5a to permit the passage of air and thereby facilitate drying of the meat inside them.

Figure 2:
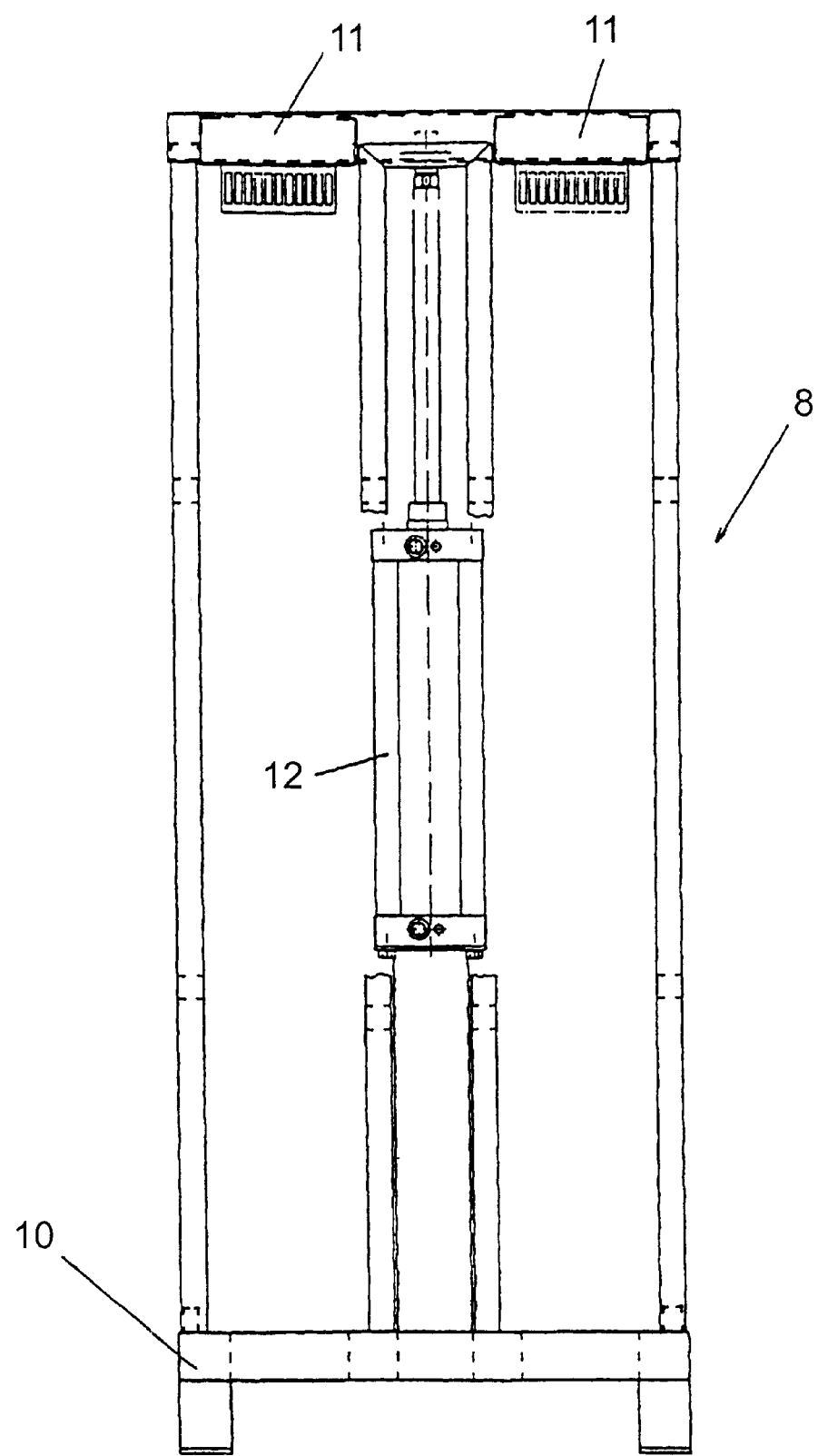
FIG. 2 is an elevation view of the pressing tower that forms part of the equipment shown in FIG. 1.
Figure 3:
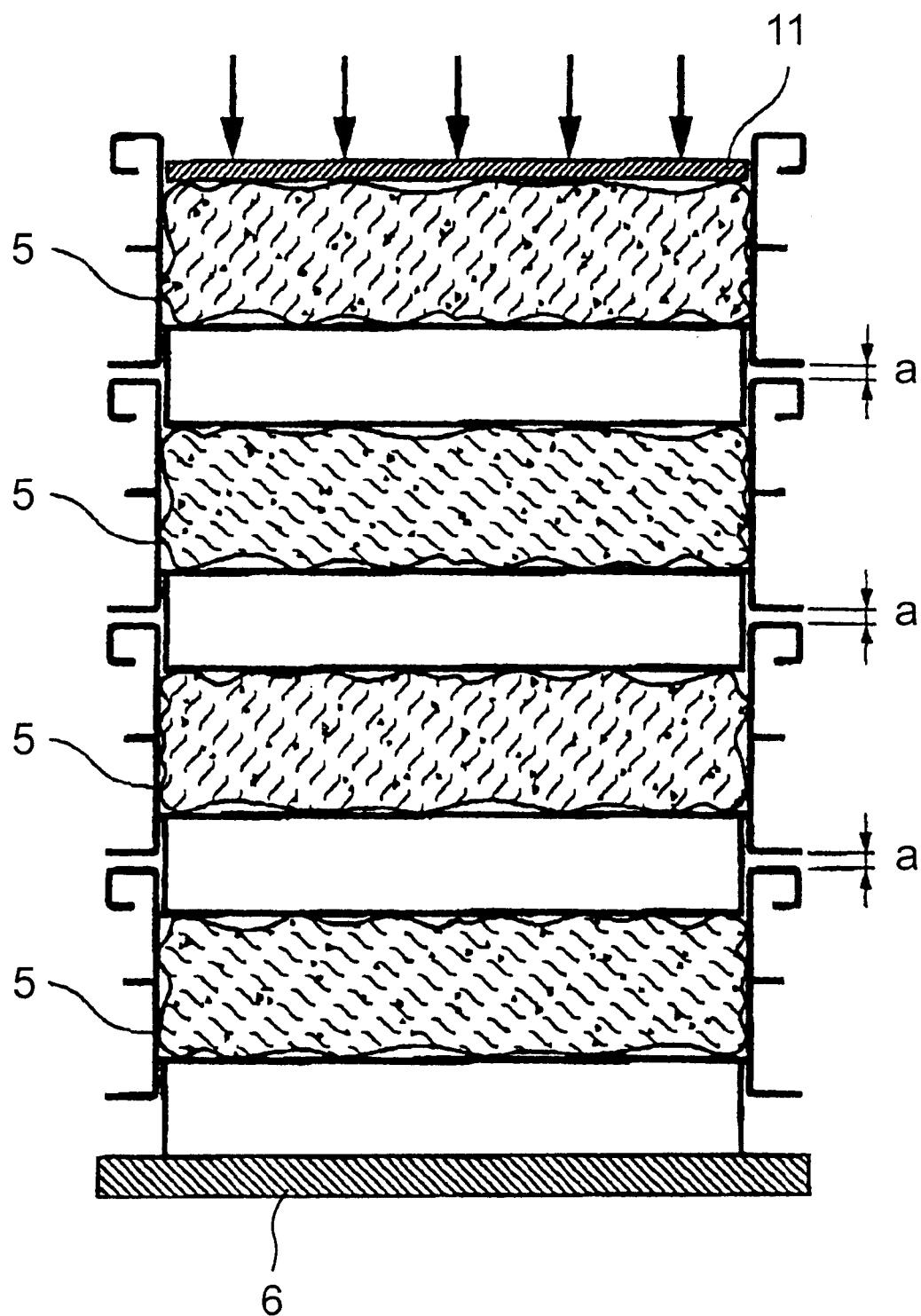
FIG. 3 is an enlarged drawing of stacked moulds 5 placed in the pressing tower showing the pressure being continuously applied to the pieces of meat for a predetermined period of time.

FIG. 2 shows more details of the pressing tower 8, which includes a base 10 on which a plurality of stacked moulds 5 are placed, with the meat being placed inside them.

The pressing tower 8 also includes a surface 11 placed in its upper part, whose downward movement is driven by an fluid-operated cylinder cylinder 12, thus applying pressure to the stack or stacks of moulds 5.

As may be seen clearly in FIG. 2, the bottom part of the upper surface 11 of the tower 8 is of a shape substantially the same as the shape of the moulds 5 into, which the meat is inserted.

The equipment described is used to carry out the method of the invention, which will be described in detail below.

Firstly, the meat is prepared from boned pieces of meat, while salting is carried out in a vacuum-massage drum, in a cold atmosphere for 24 hours.

The meat is then taken out of the drum and placed in transportation tanks 2, which will be placed on a tipping lifter 3 which will place the meat on a hopper-table 4.

The meat for moulding is then prepared, placing it inside a mould 5, wrapping it in fabric and placing the mould on a weighing scale 7. All the pieces of the finished product will thus be of substantially the same weight. In order to achieve the predetermine weight, which is usually 15 kilograms, more than one piece of meat can be used, since they will afterwards be linked to each other.

Once the desired weight has been achieved, the mould 5 will be placed in a press 6 that will for a few seconds fit the meat inside the mould 5.

A plurality of stacked moulds 5 will then be placed in the pressing tower 8. The number of stacked moulds 5 will depend on the height of the pressing tower 8 and the surface area of its base. By way of a guideline, the envisaged height of the pressing tower 8 will be approximately two and a half metres.

The meat will remain in the pressing tower 8 for approximately one month, until the meat has lost 20% of its weight. It should be noted that although the pressure exercised on the moulds would were continuous throughout the entire time they remain in the tower 8, the pressure value may be varied over that time, depending on the weight loss achieved.

When the period of time of one month has passed the moulds are taken out of the pressing tower 8 and the product taken out of the mould in the same press 6 used to fit the meat with its fabric wrapping. The piece of meat thus retains its shape, for the fact that it is not yet totally cured means that it can easily lose its shape due to incorrect handling of it.

The pieces of meat are then placed on shelves 9 for additional drying of the meat until complete curing of it has been achieved. The pieces of meat remain on the shelves 9 for approximately one month.

When the meat has been completely cured, it is withdrawn from the fabric wrapping and the product is prepared for cutting into slices. The sliced meat is then packaged for sale thereof. The method of the invention means that the slices are of the same shape and weight.

Although reference has been made to the specific embodiment of the invention, it will be clear to a person skilled in the art that the method, the pressing tower and the equipment describes can undergo many variations and modifications, and that all the details mentioned can be replaced by others that are technically equivalent without departing from the scope of protection defined by the attached claims.

What is claimed is:

1. Method for the preparation of a meat product from boned pieces of meat, said method including the steps of:
   a) salting the pieces of meat;
   b) placing the pieces of meat in a mould;
   c) maturing and drying the pieces of meat for a predetermined period of time, until the weight of the meat decreases;
   d) removing the pieces of meat from the mould;
   e) additionally drying the pieces of meat for a predetermined period of time:
      wherein the step of maturing and drying the meat is implemented by continuously applying pressure to the pieces of meat for an approximate period of time of one month.

2. The method as claimed in claim 1, wherein the pressure value applied in a continuous way to the pieces of meat is varied over a period of time depending on the weight loss achieved.

3. The method as claimed in claim 1, wherein after the meat has been placed in the mould it is first pressed to make the meat fit into the mould.

4. The method as claimed in claim 1, wherein the additional drying is carried out for an approximate period of time of one month.

5. The method as claimed in claim 1, wherein the salting of the meat is carried out in a vacuum massage drum.

6. The method as claimed in claim 1, wherein after the meat is placed in the mould the meat is weighed.

7. The method as claimed in claim 1, wherein the meat is wrapped in a net when it is placed in the mould.

* * * * *